Patented Jan. 19, 1943

2,308,980

UNITED STATES PATENT OFFICE 2,308,980

CONCRETE PRESERVATION

Ralph P. Keelor, Cleveland, Ohio

No Drawing. Application July 20, 1938,
Serial No. 220,399

7 Claims. (Cl. 260—19)

My present invention relates to the prevention of deterioration in concrete structures and includes a procedure whereby such deterioration is inhibited as well as protected concrete structures which are resistant to acids, alkalies and oxidizing agents. The invention also includes a new composition of matter for preserving concrete and a process of making such composition.

It has long been known that concrete structures disintegrate or deteriorate by a gradual continual process of weathering and that such weathering is particularly severe or rapid where the concrete structures are exposed to alternate wetting and drying. Many attempts have been made in the past to prevent the deterioration of concrete by the use of various coating and protective materials but insofar as I am aware such have not been successfully accomplished in such manner as to render concrete structures permanent. It is my belief that prior procedures in this field have failed as a result of the lack of appreciation of the structural nature of concrete and/or a lack of understanding as to just exactly what takes place internally of Portland cement; for example, when it sets.

It has, for instance, been assumed in many cases that the failure of cement after a relatively few years of use has been due to defective workmanship in either the making of the concrete or in the formation of the structures therefrom. It is, of course, true that defective molds, failures to properly mix and bind the correct proportions of ingredients, departures from the correct cement-water ratio and other errors of like nature will greatly shorten the length of life of concrete structures. My studies, however, have revealed that even concrete structures which have been properly made and molded are almost equally susceptible to deterioration and that curing the faults in workmanship does not constitute the answer to the problem of producing permanent concrete structures of enduring nature.

In order to overcome the above and other recognized defects in concrete structures it is necessary first to have an understanding of the nature of Portland cement and the formation of concrete therefrom. When Portland cement correctly mixed for the production of concrete structures undergoes what is commonly termed the initial set, there is a copious formation of tricalcium aluminate crystals. At some period after the wetting of the cement a colloidal solution of monocalcium silicate is formed which hardens and cements the tricalcium aluminate crystals together at their points of contact in a porous mass of mineral glue. In this condition and at this stage concrete is not a homogeneous mass, due to the loss of water therefrom by evaporation and other causes so that spaces or interstices are left or formed between the crystals which absorb moisture and water readily through capillary attraction.

In correctly mixed concrete there are always present what I term acid-forming materials. These are the constituents which, in the presence of or when combined with water, set up the reactions which cause the formation of the aluminate crystals referred to and also the silicate which functions as a mineral glue. In hardened cement of commercial grades at least some of these acid-forming materials are not consumed (neutralized) and thus are capable of being active under the conditions to which concrete is normally subjected; i. e., the alternate wetting and drying above referred to. Each time the concrete becomes wet a weak acid is formed between the water or moisture and the free acid-forming material during subsequent dehydration as the concrete dries. This weak acid acts as an agent of destruction insofar as the concrete is concerned and after no great period of time attacks the hardened monocalcium silicate or mineral glue causing a gradual crumbling or disintegration of the concrete structure. This action is directly analogous to the manner in which acids would deteriorate the structure if they were applied from external or other sources.

This explanation of the deterioration of concrete is not a theory as I have carried out experiments which definitely prove that deterioration proceeds along the lines just explained. For instance, to one specimen of concrete made as perfectly as possible I added daily to the exterior surface a few drops of distilled water. In a period of six months deterioration had proceeded appreciably enough to be observable and in twelve months the deterioration had proceeded relatively rapidly. At the end of 18 months the concrete was comparatively badly deteriorated as compared with the original material and had lost on the surface at least a number of its valuable properties and characteristics.

Some of the prior attempts to inhibit the deterioration of concrete have taken the form of applying resinous coatings to the concrete. These I have found to be of little or no value and serve at most only to slightly retard deterioration. The resins themselves are too hard or brittle and do not produce any stable composition. It has also been proposed to add oils to resins to form a type of material which can be generically designated as a varnish but these oils have not advanced the situation materially, due to the fact that the varnishes themselves oxidize and deteriorate. My investigations with various resins and oils have convinced me that no composition has heretofore been proposed which will have any material lasting or beneficial effect.

It is, accordingly, one of the objects of my present invention to produce a concrete structure which shall be free from the objections and disadvantages inherent in concrete structures as previously produced and which shall be resistant against acids, alkalies and oxidizing agents over a very extensive period of time.

Another object of my invention resides in the application to concrete structures of a special composition which will penetrate an appreciable distance below the surface of the concrete and will render such penetrated portion of the concrete absolutely and permanently resistant.

A further object of the invention resides in treating concrete with a special composition which will render the concrete permanent and impervious for an appreciable distance below the surface thereof and then applying a similar but modified composition as a sealing coat on such treated concrete surfaces.

A still further object of my invention resides in rendering concrete structures permanently resistant to acids, alkalies and oxidizing agents in a simple, inexpensive manner.

More specifically, an object of my invention resides in applying to concrete a composition which will prevent the formation of acids within the concrete structure and hence which prevents attack on the monocalcium silicate which serves to cement the tricalcium aluminate crystals together.

Other and further objects and advantages will be understood by those skilled in this art or will be apparent or pointed out hereinafter.

I have discovered that a composition comprising essentially a synthetic phenol formaldehyde resin, tung oil and paraffin produced as hereinafter set forth is a satisfactory and successful preventive against the deterioration of concrete when applied to the surface of the concrete as by spraying, painting or other suitable manner. This composition penetrates into the concrete for an appreciable distance of the order of ¼ to ⅜ of an inch which I have found to be ample for protective purposes. The composition is one which after applied hardens quickly and remains highly resistant to destructive agents, such as acids, alkalies and oxidizing agents. At the same time, it prevents access of moisture, water or other medium to the mineral glue.

In preparing my present composition I first treat the tung oil to reduce or eliminate its inherent tendency to oxidize and dry, which normally would continue to total destruction. This is accomplished by heating the raw tung oil slowly until its temperature is raised to approximately 380° F., at which temperature it is held for one hour. At the start of this heating I add to the oil as a catalyst about 0.02% of a naphthanate drier containing the acid radical of naphthenic acid. During the heating the tung oil polymerizes, becoming converted to a stable and insoluble condition. While the tung oil is still at the indicated temperature, I add thereto paraffin wax. I have determined that such paraffin wax is soluble in tung oil under these conditions to the extent of 4% by weight of the tung oil. Therefore, I preferably add sufficient paraffin wax to make a 4% solution but, depending upon conditions and the particular use to which the composition is to be put, the amount of paraffin wax may range from approximately 1% to approximately 4%, the wax being soluble in the oil within these limits. This solution of wax in tung oil I have found to be an admirable constituent of my present composition, and in addition the wax removes from the oil the latter's property of taking up oxygen.

Paraffin wax may be represented by the chemical notation $C_{24}H_{50}$, and I have found that by allowing the hot tung oil and wax to stand or digest during the hour's period of time above mentioned a structural rearrangement occurs in that the ring structure of the polymerized tung oil undergoes a stereo-isomeric change, and that during such change the hydrocarbonaceous wax enters the ring structure at such location as to dominate it by imparting to it its own characteristics. These characteristics include resistance to acids, alkalies, and oxidizing agents.

As I have explained above, one of the essential ingredients of my composition is a synthetic phenol formaldehyde resin. This is produced in the usual way from phenol and formaldehyde. In producing such a phenol-formaldehyde resin it is known that the reaction is one of combined condensation and polymerization and proceeds in three distinct steps or stages. In the first stage, the intermediate composition is hardenable but will melt upon heating and is soluble in certain solvents. The second stage is one in which the intermediate composition will still harden and soften from heat but is not soluble. In the third stage the material is hard and insoluble at all times. It is probable that the first stage is due to condensation which is rapidly completed, and that the second and third stages are due to polymerization. While there is some doubt as to the precise mechanism of these changes, I believe that polymerization commences just as soon as some degree of condensation has taken place, and thereafter that the two changes proceed side by side. For purposes of convenience, I will hereinafter refer to the first stage as stage A and the second stage as stage B.

I therefore take a quantity of stage A resin and incorporate therein a suitable proportion of the tung oil-wax solution above described, this forming what I term, for convenience, a varnish. I prefer a short oil varnish and one which contains as much resin as possible. I have found that a six (6) to (8) gallon varnish is best suited for the present purposes. In the latter case, to each eight (8) gallons of the tung oil-wax solution I melt in 100 pounds of stage A resin. In carrying out this procedure, however, I concomitantly convert the stage A resin to stage B resin due to the application of heat. In heating the stage A resin I start at room temperature and slowly increase the temperature up to about 215° F., at which temperature it is held for one hour. The temperature is then again slowly increased at such rate that it requires approximately one hour to reach a temperature of 250° F. I then maintain the resin at the 250° F. temperature for approximately three hours. The tung oil-wax solution acts to prevent embrittlement of the resin and imparts a permanent plasticity thereto. The resin itself constitutes about 10% of the total varnish.

Since such a composition is very heavy and viscous when cool, I have found it desirable to introduce a strong solvent thereinto, and for this purpose I utilize a high flash coal tar or varnish maker's naphtha. These solvents are added while the material is still hot and serve to maintain liquidity of the composition when cool. Sufficient of these solvents is added to produce a composition containing approximately 19% non-volatiles. The coal tar solvent itself is approximately 25% of the total varnish.

Based upon the foregoing facts and considerations, I have discovered that a composition admirably adapted for the purposes of the present invention is represented by the following exemplary formula wherein the percentages recited are by weight:

| | Per cent |
|---|---|
| Petroleum spirits | 68.5 |
| Coal tar naphtha (111° F. flash point) | 9.5 |
| Resin-tung oil mixture | 21.5 |
| Petroleum wax (m. pt. 105° F.) | .5 |
| Total | 100.0 |

A very small percentage of resinate drier is usually added to stimulate setting and drying. Except for the petroleum wax, the above percentages are approximate and may vary somewhat on either side of the figures given. I have, however, discovered that .5% wax is a critical maximum beyond which the present results are not fully attained. I may use somewhat less than .5% wax but the percentage should be between 1% and 4% of the weight of the tung oil as above explained.

It is this composition which is applied cold to the exterior surface of concrete for the purpose of protecting the concrete from disintegration as above set forth. Since, under some conditions, the above composition will leave a stain on concrete, I have produced an exterior or finishing coating for those cases where the presence of such stain is objectionable. This finishing coating restores the concrete to its natural finish and, at the same time, affords additional protection to the concrete by providing a solid film thereon which covers pin holes and other surface defects which have a magnitude great enough to prevent their being filled or closed by the application of the first composition. The finishing coating is the same as the coating just described with the exception that the amount of the solvents is reduced to one-half, and to the same is added, in finely ground condition, two pounds per gallon of titanium oxide or other suitable white enamel pigment. To complete the finishing coating and to make it resemble concrete or cement when dry, I incorporate nine pounds per gallon of 200 mesh granular air-cooled blast furnace slag and one-half gallon of varnish makers' naphtha.

One gallon of the finishing coating serves for each 200 square feet of concrete surface to be treated. After application the coating recedes a slight amount, thus leaving an exterior surface which has the appearance of cement. The coating may be applied with a spray gun, by painting, or in any other suitable manner.

In accordance with the foregoing, concrete structures can be produced which have greatly increased effective life in a simple and inexpensive manner. It is to be understood, however, that the above is purely exemplary or illustrative and that I may resort to various modifications, substitutions, additions, and omissions without departing from the spirit, scope or principles thereof. Rather the invention is to be defined by the appended claims.

What I claim is new and desire to secure by Letters Patent is:

1. A non-deteriorating concrete structure which comprises a mass of concrete the surfaces of which are permeated to a depth of ¼–⅜ of an inch with chemical complex derived from a solution of 1–4% of petroleum wax in a mixture of tung oil and synthetic phenol formaldehyde resin reduced with a solvent.

2. A concrete protective and penetrative composition of matter for preserving concrete and the like against the attack of acids, alkalies and oxidizing agents which comprises substantially the following ingredients in substantially the following proportions by weight:

| | Percent |
|---|---|
| Petroleum spirits | 68.5 |
| Coal tar naphtha | 9.5 |
| Phenol formaldehyde resin-tung oil mixture | 21.5 |
| Petroleum wax | .5 |

3. A process of protecting concrete and the like against the attack of acids, alkalies and oxidizing agents which comprises impregnating the concrete to a depth of ¼–⅜ of an inch with the composition of matter set forth in claim 2 in the cold.

4. A process of making a concrete preservative for protecting concrete against attack by acids, alkalies and oxidizing agents which comprises dissolving 1–4% of petroleum wax in hot tung oil, mixing the same with stage A phenol formaldehyde resin as herein defined by melting the resin into the tung oil-wax solution, adding solvent diluents and cooling.

5. A process as set forth in claim 4 wherein a small percentage of a naphthanate is added to the tung oil and wherein a small percentage of a resinate drier is added to the otherwise completed composition.

6. A process of making a concrete preservative for protecting concrete against deteriorative change which comprises the steps of heating raw tung oil slowly to about 380° F., adding paraffin wax thereto in an amount not exceeding the solubility limits of the wax in the oil, melting stage A phenol formaldehyde resin as herein defined into the tung oil-wax solution while heating the resin to 215° F., holding it at that temperature for about one hour, increasing the temperature to about 250° F., holding it at that temperature for about three hours, adding solvent diluents to control fluidity and viscosity and cooling the composition.

7. A process as set forth in claim 6 wherein about 0.02% of the acid radical of naphthenic acid is added to the tung oil as a catalyst and wherein a small percentage of a resinate drier is added to the otherwise completed composition.

RALPH P. KEELOR.